(12) United States Patent
McKain et al.

(10) Patent No.: US 7,623,754 B1
(45) Date of Patent: *Nov. 24, 2009

(54) MOTION PICTURE RECORDING DEVICE USING DIGITAL, COMPUTER-READABLE NON-LINEAR MEDIA

(75) Inventors: James A. McKain, Andover, MA (US); Peter Fasciano, Natick, MA (US); Jeffrey D. Kurtze, Nashua, NH (US); Stephen M. DiSciullo, Danvers, MA (US); Paul H. Greaves, Tyngsboro, MA (US); Harry Der, Westford, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/932,784

(22) Filed: Sep. 18, 1997

Related U.S. Application Data

(63) Continuation of application No. 08/702,152, filed on Aug. 23, 1996, now abandoned, which is a continuation of application No. 08/392,536, filed on Feb. 23, 1995, now abandoned.

(51) Int. Cl.
*H04N 5/91* (2006.01)

(52) U.S. Cl. .................... 386/52; 386/95; 386/117; 386/125

(58) Field of Classification Search .................... 386/46, 386/107, 117, 38, 111, 112, 109, 125, 124, 386/52; 358/906, 909; 348/552, 722, 6; 345/328

See application file for complete search history.

(56) References Cited

U.S. PATENT DOCUMENTS

| | | | |
|---|---|---|---|
| 2,927,154 A | | 3/1960 | Wolfe |
| 3,594,513 A | | 7/1971 | Greenberg |
| 3,617,626 A | * | 11/1971 | Bluth ........................ 386/4 |
| 3,875,329 A | | 4/1975 | Nagel |
| 4,061,228 A | | 12/1977 | Johnson |
| 4,106,846 A | | 8/1978 | Russin |
| 4,139,903 A | | 2/1979 | Morrill, Jr. et al. |
| 4,176,897 A | | 12/1979 | Cameron |

(Continued)

FOREIGN PATENT DOCUMENTS

DE 4304506 A1 8/1993

(Continued)

OTHER PUBLICATIONS

Mabon, Stuart P. And Ericson M. Dunstan, "Built-In Toughness Suits Hard Disks to Face the Real World." Jan., 1983 (vol. 1), pp. 200-207. Computer-Technology Review.

(Continued)

*Primary Examiner*—Huy T Nguyen
(74) *Attorney, Agent, or Firm*—Peter J. Gordon; Oliver Strimpel

(57) ABSTRACT

A digital media recorder including a video camera digitizing circuitry and a digital computer readable and writable random access medium, such as magnetic or optical disk, in which sequences of digital still images are stored directly on the recording medium. Audio recording capabilities may also be provided. This system eliminates the need for video tape for recording video information, thereby providing the capability for a purely digital video system for capture, editing and playback.

20 Claims, 7 Drawing Sheets

U.S. PATENT DOCUMENTS

| | | | |
|---|---|---|---|
| 4,195,317 A | 3/1980 | Stratton | |
| 4,257,063 A | 3/1981 | Loughry | |
| 4,281,354 A | 7/1981 | Conte | |
| 4,285,483 A | 8/1981 | Cipollone | |
| 4,295,154 A | 10/1981 | Hata | |
| 4,346,205 A | 8/1982 | Hiles | |
| 4,373,193 A | 2/1983 | Haag et al. | |
| 4,378,572 A | 3/1983 | Hoffman | |
| 4,390,904 A | 6/1983 | Johnston | |
| 4,408,309 A | 10/1983 | Kiesling et al. | |
| 4,409,670 A | 10/1983 | Herndon et al. | |
| 4,480,317 A | 10/1984 | Haag et al. | |
| 4,507,689 A | 3/1985 | Kozuki | |
| 4,516,678 A | 5/1985 | Fotiadis et al. | |
| 4,523,226 A | 6/1985 | Lipton | |
| 4,538,188 A | 8/1985 | Barker | |
| 4,547,815 A | 10/1985 | Kimura | |
| 4,550,343 A | 10/1985 | Nakatani | |
| 4,567,532 A | 1/1986 | Baer | |
| 4,568,133 A | 2/1986 | Amano et al. | |
| 4,635,136 A | 1/1987 | Ciampa et al. | |
| 4,642,682 A | 2/1987 | Orsburn | |
| 4,646,241 A | 2/1987 | Ratchford et al. | |
| 4,654,848 A | 3/1987 | Noguchi | |
| D289,290 S | 4/1987 | Enomoto et al. | |
| 4,660,102 A | 4/1987 | Kawakami et al. | |
| 4,675,755 A | 6/1987 | Baumeister et al. | |
| 4,685,003 A | 8/1987 | Westland | |
| 4,688,016 A | 8/1987 | Fok | |
| 4,689,683 A | 8/1987 | Efron | |
| 4,695,887 A | 9/1987 | Peterson | |
| 4,695,888 A | 9/1987 | Peterson | |
| 4,695,891 A | 9/1987 | Peterson | |
| 4,695,905 A | 9/1987 | Utsugi | |
| 4,714,962 A | 12/1987 | Levine | |
| D293,784 S | 1/1988 | Miyashita et al. | |
| 4,717,971 A | 1/1988 | Sawyer | |
| 4,746,990 A | 5/1988 | Katoh et al. | |
| 4,752,834 A | 6/1988 | Koombes | |
| 4,755,889 A | 7/1988 | Schwartz | |
| 4,774,570 A | 9/1988 | Araki | |
| 4,777,537 A | 10/1988 | Veno | |
| 4,792,864 A | 12/1988 | Watanabe | |
| 4,816,901 A | 3/1989 | Music | |
| 4,819,101 A | 4/1989 | Lemelson | |
| 4,823,285 A | 4/1989 | Blancato | |
| 4,835,736 A | 5/1989 | Easterday | |
| 4,841,503 A | 6/1989 | Yamada | |
| 4,847,677 A | 7/1989 | Music | |
| 4,855,813 A | 8/1989 | Russell | |
| 4,856,656 A | 8/1989 | Sugimoto et al. | |
| 4,857,990 A | 8/1989 | Horgan | |
| 4,864,391 A | 9/1989 | Taguchi | |
| 4,864,429 A | 9/1989 | Eigeldinger | |
| 4,872,054 A | 10/1989 | Gray | |
| 4,879,611 A | 11/1989 | Fukui | |
| 4,891,715 A | 1/1990 | Levy | |
| 4,894,789 A | 1/1990 | Yee | |
| 4,897,741 A | 1/1990 | Inoue et al. | |
| 4,901,161 A | 2/1990 | Giovanella | |
| 4,918,523 A | 4/1990 | Simon | |
| 4,924,303 A | 5/1990 | Brandon | |
| 4,926,291 A | 5/1990 | Sarraf | |
| 4,928,171 A | 5/1990 | Kline | |
| 4,935,816 A | 6/1990 | Faber | |
| 4,937,676 A | 6/1990 | Finelli et al. | |
| 4,943,866 A | 7/1990 | Barker et al. | |
| 4,963,995 A | 10/1990 | Lang | |
| 4,969,042 A | 11/1990 | Houtman | |
| 4,970,663 A | 11/1990 | Bedell | |
| 4,982,290 A * | 1/1991 | Nishi et al. | 386/38 |
| 4,982,390 A | 1/1991 | Tanaka | |
| 5,010,499 A | 4/1991 | Yee | |
| 5,012,327 A | 4/1991 | Bishop | |
| 5,027,400 A | 6/1991 | Baji | |
| 5,038,319 A | 8/1991 | Carter et al. | |
| 5,045,940 A | 9/1991 | Peters et al. | |
| 5,056,056 A | 10/1991 | Gustin | |
| 5,057,932 A | 10/1991 | Lang | |
| 5,067,130 A | 11/1991 | Jackson | |
| 5,083,313 A | 1/1992 | Reinsch | |
| 5,084,775 A | 1/1992 | Kodama et al. | |
| 5,099,322 A | 3/1992 | Gove | |
| 5,099,337 A | 3/1992 | Csury | |
| 5,103,301 A | 4/1992 | Cosentino | |
| 5,109,482 A * | 4/1992 | Bohrman | 345/328 |
| 5,115,311 A | 5/1992 | Jaqua | |
| 5,119,178 A | 6/1992 | Sakata et al. | |
| 5,119,191 A | 6/1992 | Van den Heuvel | |
| 5,121,470 A | 6/1992 | Trautman | |
| 5,121,476 A | 6/1992 | Yee | |
| 5,124,807 A | 6/1992 | Dunlap | |
| 5,126,851 A | 6/1992 | Yoshimura | |
| 5,132,800 A | 7/1992 | Wada et al. | |
| 5,133,079 A | 7/1992 | Ballantyne | |
| 5,134,661 A | 7/1992 | Reinsch | |
| 5,138,459 A | 8/1992 | Roberts et al. | |
| 5,140,414 A | 8/1992 | Mowry | |
| 5,144,461 A | 9/1992 | Horan | |
| 5,155,584 A | 10/1992 | Taguchi et al. | |
| 5,157,512 A | 10/1992 | Inada et al. | |
| 5,164,839 A | 11/1992 | Lang | |
| 5,168,363 A * | 12/1992 | Kojima et al. | 348/704 |
| 5,173,779 A | 12/1992 | Lee | |
| 5,179,437 A | 1/1993 | Kawada et al. | |
| 5,192,999 A | 3/1993 | Graczyk | |
| 5,211,566 A | 5/1993 | Bates et al. | |
| 5,218,672 A | 6/1993 | Morgan et al. | |
| 5,227,863 A | 7/1993 | Bilbrey | |
| 5,231,501 A | 7/1993 | Sakai | |
| 5,233,438 A | 8/1993 | Funahashi | |
| 5,237,648 A | 8/1993 | Mills et al. | |
| 5,239,419 A | 8/1993 | Kim | |
| 5,241,389 A | 8/1993 | Bilbrey | |
| 5,241,428 A | 8/1993 | Goldwasser et al. | |
| 5,253,078 A | 10/1993 | Balkanski | |
| 5,262,877 A | 11/1993 | Otsuka | |
| 5,267,351 A * | 11/1993 | Reber et al. | 707/104.1 |
| 5,270,831 A | 12/1993 | Parulski | |
| 5,274,758 A | 12/1993 | Beitel et al. | |
| 5,282,092 A | 1/1994 | Wilhelms | |
| 5,283,819 A | 2/1994 | Glick | |
| 5,301,026 A | 4/1994 | Lee | |
| 5,301,240 A | 4/1994 | Stockum et al. | |
| 5,306,956 A | 4/1994 | Ikeda et al. | |
| 5,307,456 A | 4/1994 | MacKay | |
| 5,309,528 A | 5/1994 | Rosen | |
| 5,325,202 A | 6/1994 | Washino | |
| 5,329,320 A | 7/1994 | Yifrach | |
| 5,345,313 A * | 9/1994 | Blank | 348/598 |
| 5,355,450 A | 10/1994 | Garmon et al. | |
| 5,371,551 A | 12/1994 | Logan et al. | |
| 5,372,515 A | 12/1994 | Miller et al. | |
| 5,384,667 A | 1/1995 | Beckwith | |
| 5,390,028 A | 2/1995 | Kobayashi | |
| 5,404,316 A * | 4/1995 | Klingler et al. | 345/328 |
| 5,408,383 A | 4/1995 | Nagasaka et al. | |
| 5,424,755 A | 6/1995 | Lucas et al. | |
| 5,431,161 A | 7/1995 | Ryals et al. | |
| 5,434,678 A | 7/1995 | Abecassis | |
| 5,450,140 A | 9/1995 | Washino | |
| 5,452,378 A | 9/1995 | Rosen | |
| 5,465,120 A * | 11/1995 | Schultheiss | 348/716 |
| 5,471,666 A | 11/1995 | Sugiyama et al. | |

| | | | |
|---|---|---|---|
| 5,477,264 A | 12/1995 | Sarbadhikari et al. | |
| 5,479,205 A * | 12/1995 | Silverbrook | 358/906 |
| 5,483,285 A | 1/1996 | Lim et al. | |
| 5,488,433 A * | 1/1996 | Washino et al. | 348/722 |
| 5,497,193 A | 3/1996 | Mitsuhashi et al. | |
| 5,532,740 A | 7/1996 | Wakui | |
| 5,533,193 A | 7/1996 | Roscoe | |
| 5,534,921 A | 7/1996 | Sawanobori | |
| 5,537,157 A * | 7/1996 | Washino et al. | 348/722 |
| D373,778 S | 9/1996 | Fasciano et al. | |
| 5,559,554 A * | 9/1996 | Uekane et al. | 348/333.02 |
| 5,568,275 A | 10/1996 | Norton et al. | |
| 5,579,239 A * | 11/1996 | Freeman et al. | 386/109 |
| 5,633,837 A | 5/1997 | Gantt | |
| 5,636,360 A | 6/1997 | Courts et al. | |
| 5,661,823 A | 8/1997 | Yamauchi et al. | |
| 5,701,383 A | 12/1997 | Russo et al. | |
| 5,715,018 A * | 2/1998 | Fasciano et al. | 348/8 |
| 5,724,605 A | 3/1998 | Wissner | |
| 5,771,330 A | 6/1998 | Takano et al. | |
| 5,802,361 A | 9/1998 | Wang et al. | |
| 5,842,170 A | 11/1998 | Daberko et al. | |
| 5,946,445 A * | 8/1999 | Peters et al. | 386/52 |
| 5,966,495 A * | 10/1999 | Takahashi et al. | 386/68 |
| 5,999,406 A | 12/1999 | McKain et al. | |
| 6,011,898 A | 1/2000 | Iwasaki et al. | |
| 6,035,367 A | 3/2000 | Laws | |
| 6,058,236 A | 5/2000 | Peters et al. | |
| 6,339,531 B1 | 1/2002 | McKain et al. | |
| 6,678,461 B1 | 1/2004 | Peters et al. | |
| 2003/0034997 A1 | 2/2003 | McKain et al. | |
| 2003/0194206 A1 | 10/2003 | Peters et al. | |
| 2003/0206715 A1 | 11/2003 | Peters et al. | |
| 2005/0053352 A1 | 3/2005 | McKain et al. | |

FOREIGN PATENT DOCUMENTS

| | | |
|---|---|---|
| EP | 0210497 | 9/1987 |
| EP | 0438299 A2 | 7/1991 |
| EP | 0469850 A2 | 2/1992 |
| EP | 0473322 A1 | 4/1992 |
| EP | 0560624 A2 | 6/1993 |
| EP | 0617542 A2 | 9/1994 |
| EP | 0618739 A2 | 10/1994 |
| EP | 0645765 A1 | 3/1995 |
| GB | 2242304 A | 9/1991 |
| GB | 2286282 A | 8/1995 |
| JP | 1-502940 | 10/1989 |
| JP | 5-95527 | 4/1993 |
| JP | 3-314435 | 6/1993 |
| JP | 5-159536 | 6/1993 |
| JP | 6-110425 | 4/1994 |
| JP | 6-276471 | 9/1994 |
| JP | 6-309861 | 11/1994 |
| WO | WO93-12481 | 6/1993 |
| WO | WO93-21635 | 10/1993 |
| WO | WO93-24932 | 12/1993 |
| WO | WO94/23428 | 10/1994 |
| WO | WO96/26600 A | 8/1996 |
| WO | WO96/26601 | 8/1996 |
| WO | WO96/26602 | 8/1996 |

OTHER PUBLICATIONS

Gardner, Larry J. And David H. Scoggins, "A Closed-Loop Digital Video Editing System." Aug. 1990, pp. 634-638, SMPTF Journal.

* cited by examiner

MOTION PICTURE RECORDING DEVICE USING DIGITAL, COMPUTER-READABLE NON-LINEAR MEDIA

CROSS REFERENCE TO RELATED APPLICATIONS

This application is a continuing application of U.S. application Ser. No. 08/702,152, filed Aug. 23, 1996, now abandoned, which is a file-wrapper continuation application of U.S. application Ser. No. 08/392,536, filed Feb. 23, 1995, abandoned.

FIELD OF THE INVENTION

This invention relates to motion picture recording devices and processes.

BACKGROUND OF THE INVENTION

Present day video recorders are typically a combination of a video camera with a video tape recorder which are constructed so as to be portable. They are often called camcorders or video tape recorders (VTR). For the purposes of this application, they are referred to as video tape recorders. All of the present day portable video tape recorders known to the inventors use a video tape, usually contained within a cassette, as the recording medium. Recording is done in numerous formats, including analog BETA and VHS format, and the digital D1 format. A major disadvantage of video tape recorders is that video tape allows only linear access to a given point on the video tape. That is, if the tape has just finished recording, in order to access the beginning of a recorded session located at the beginning of the tape, the tape must be rewound.

The problem of linear access to video tape recordings is most obvious in the field of broadcast television news. Typically, a reporting crew will go to a news location with a video tape recorder and record an event. Upon completion of recording, the tape must be rewound and then played back and transmitted, for example via satellite or microwave link, to a base station in a studio facility. At the base station, the information can then be edited into a final news program. Editing today is commonly done digitally, using a non-linear computer-based editing system such as the Avid/1 Media Composer available from Avid Technology, Inc. of Tewksbury, Mass. Such a system typically requires digitization, or, conversion of analog video signals into a digital, computer-readable format. Even if the video signal is from digital video tape, its linear access still presents the same problems. Tape recording, transmission and digitization are usually performed unless there is an actual live connection from the camera to the base station. Because of the delays in rewinding, playback and transmission of recorded information from a video tape, there is typically a half hour delay between the completion of recording of an event and the time an edited version of the recorded event can actually be broadcast by the base station. This delay is a significant competitive problem in broadcast news where the time to air is very important and stations strive to produce "up to the minute" news coverage and broadcast.

Today, electronic still cameras exist which record a still image on magnetic medium, such as a floppy disk. Such a camera is described in U.S. Pat. No. 5,084,775, issued Jan. 28, 1991, and assigned to Sony Corporation. However, the camera described in that patent records still images only, not full motion video images. In addition, computer video capture systems exist, such as the NuVista video capture card available from RasterOps/Truevision, Inc. Such systems, however, have not been reduced to the portable form of the present invention to perform live digital capture directly from a camera.

Additionally, it has been recently suggested by those skilled in the field of motion picture recording that numerous problems with a non-linear digital motion picture recorder are insurmountable. In particular, it has been suggested that there is a large image quality trade-off with increased recording time capability. Additionally, it has been suggested that, using disk-based media, a little shake of the camera would cause a disk crash. Finally, it has been suggested that the disk media is substantially costlier than tape.

SUMMARY OF THE INVENTION

The present invention overcomes the problems due to the linearity of the recording medium in the video recorder by replacing the analog video tape with a digital, computer-readable and writable random-access recording medium, such as a magnetic or optical disk. In a preferred embodiment, by providing a smaller sized disk-drive, e.g. two and one-half inches in diameter, and shock and vibration isolation packaging, the risk of damage or disk failure is significantly reduced. Additionally, broadcast quality video can be provided by a compressed stream of digital motion picture information at rates of four megabytes per second (4 Mbps). In one embodiment of this invention, the disk-based recording media can record about 10 minutes of continuous video.

By providing a portable video recorder which records directly onto a digital, computer-readable and writable random-access (i.e., non-linear) medium, there is no longer any need for delays due to rewinding the tape, or for digitization of the video tape. With the advantages of non-linear recording and non-linear editing, further in combination with a non-linear broadcast system, the time to broadcast of a news event can be drastically reduced. This reduction in the time to broadcast provides a significant competitive advantage for a broadcast news station.

Accordingly, one aspect of the present invention is a digital motion picture recorder. The recorder includes a housing sized to be portable by an individual. A motion picture camera is mounted on the housing, and provides a motion video signal as an output. A conversion circuit is mounted on the housing for converting the motion video signal into a sequence of digital still images. There is an output to a digital, computer-readable and writable random-access medium which can be removably mounted in and attached to the housing and connected to receive the sequence of digital images for storing thereon in a computer-readable file format.

In one embodiment, the digital motion picture recorder also includes a means to compress the sequence of digital images which are received by the random access medium.

In another embodiment, the digital motion picture recorder also includes a motion picture editing system within the housing. This embodiment may also include a display and editing controls on the housing to edit and display the sequence of digital images.

In another embodiment, the digital recording medium of the digital motion picture recorder is a disk-type drive. In this embodiment, the disk-type drive is mounted in a separate companion housing which is detachable from the portable housing. The separate companion housing is preferably ruggedized.

In another embodiment, a calibration system is also provided to calibrate the motion video signal to video color standards.

DETAILED DESCRIPTION

The present invention will be more completely understood through the following detailed description which should be read in conjunction with the attached drawing in which similar reference numbers indicate similar structures.

Figure 1:
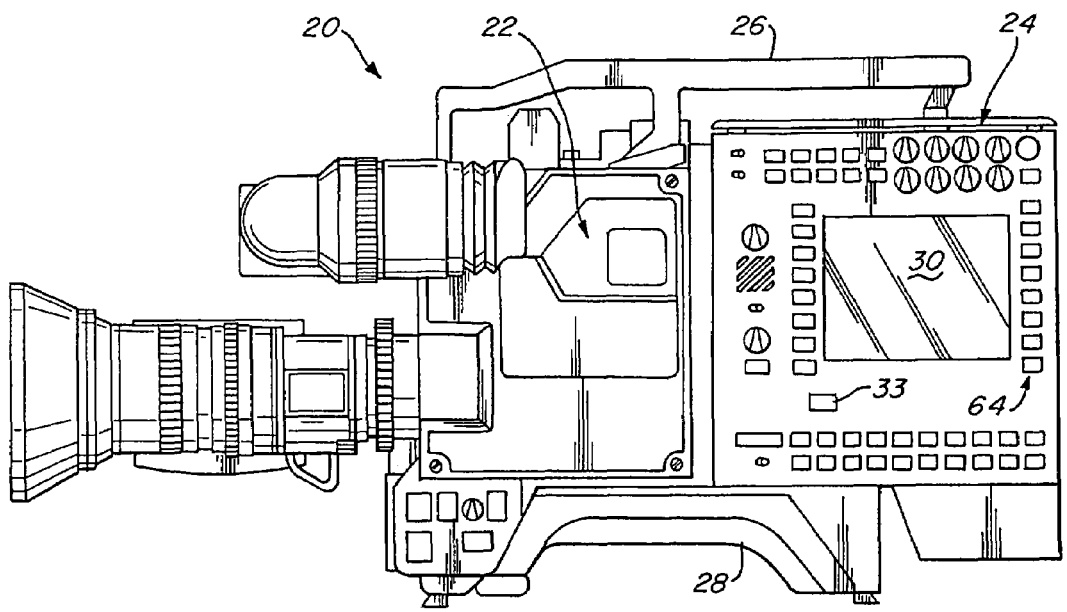
FIG. 1 is a left side view of a digital motion picture recorder affixed to a video camera in accordance with the present invention.

FIG. 1 shows a video camera/recorder 20 which includes a combination of a video camera 22 and a video recorder 24. The camera may be one of many types of video cameras, and may be, for example, either the HL-57 camera made by Ikegami Corporation of Japan, or the "400" camera made by the Sony Corporation of Japan. The video camera/recorder 20 also typically has a handle 26 and shoulder support 28. On the video recorder 24 of the device, typically a display 30 is used to provide the user status and other pertinent information to be detailed below. The camera, electronic circuitry (such as will be described below in connection with FIGS. 11-12) and recording medium may be in one piece, such that the camera 22 and recorder 24 are integrated, or may be in two pieces such that the camera 22 and recorder 24 are separable from each other. Many tape-based recorders used for news reporting are in such a two-part form, and often take the shape as shown in Japanese utility model 63-9907, also referred to as 56-134889, or Japanese patent 61-187165.

The output of the video camera is generally an analog video signal. Presently known cameras available from Ikegami have a 79-line bus for the purposes of communicating with a recorder, whereas Sony cameras use a 52-line bus. The recorder of the present invention provides physical and electrical connections to interface with the Ikegami, Sony or other bus, so that the motion picture recorder of the present invention receives, using techniques known in the art, the output of the camera as if the recorder were a videocassette recorder.

The motion picture recorder also includes, using techniques well known to those skilled in the art, electrical contacts and connections (not shown) to turn the camera on and off, initiate recording, etc.

Figure 2:
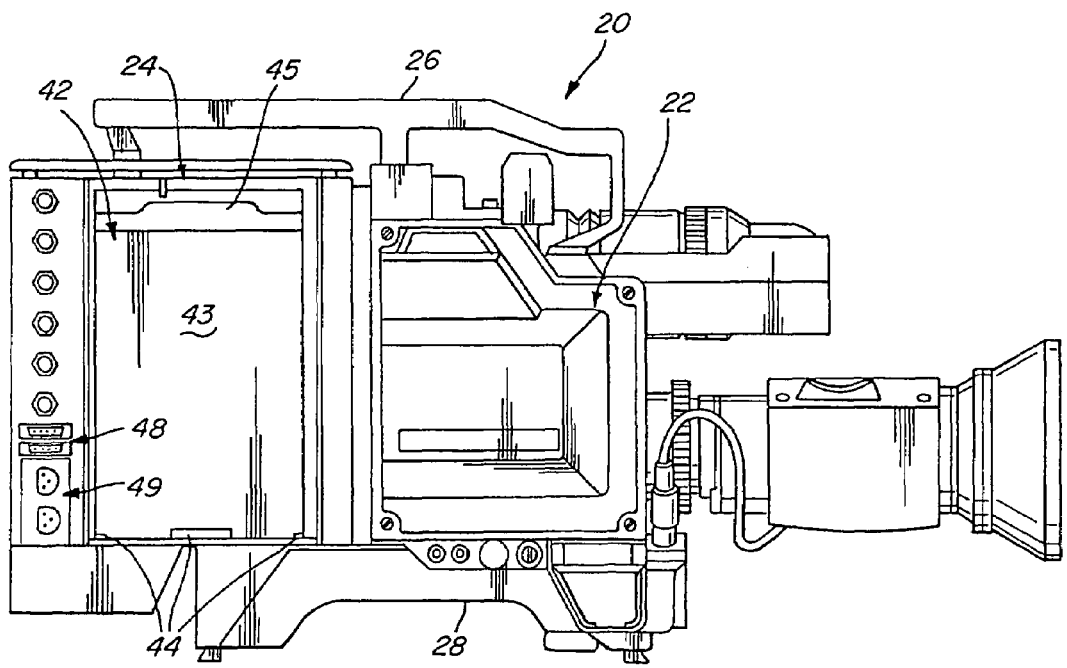
FIG. 2 is a right side view of the digital motion picture recorder of FIG. 1.
Figure 3:
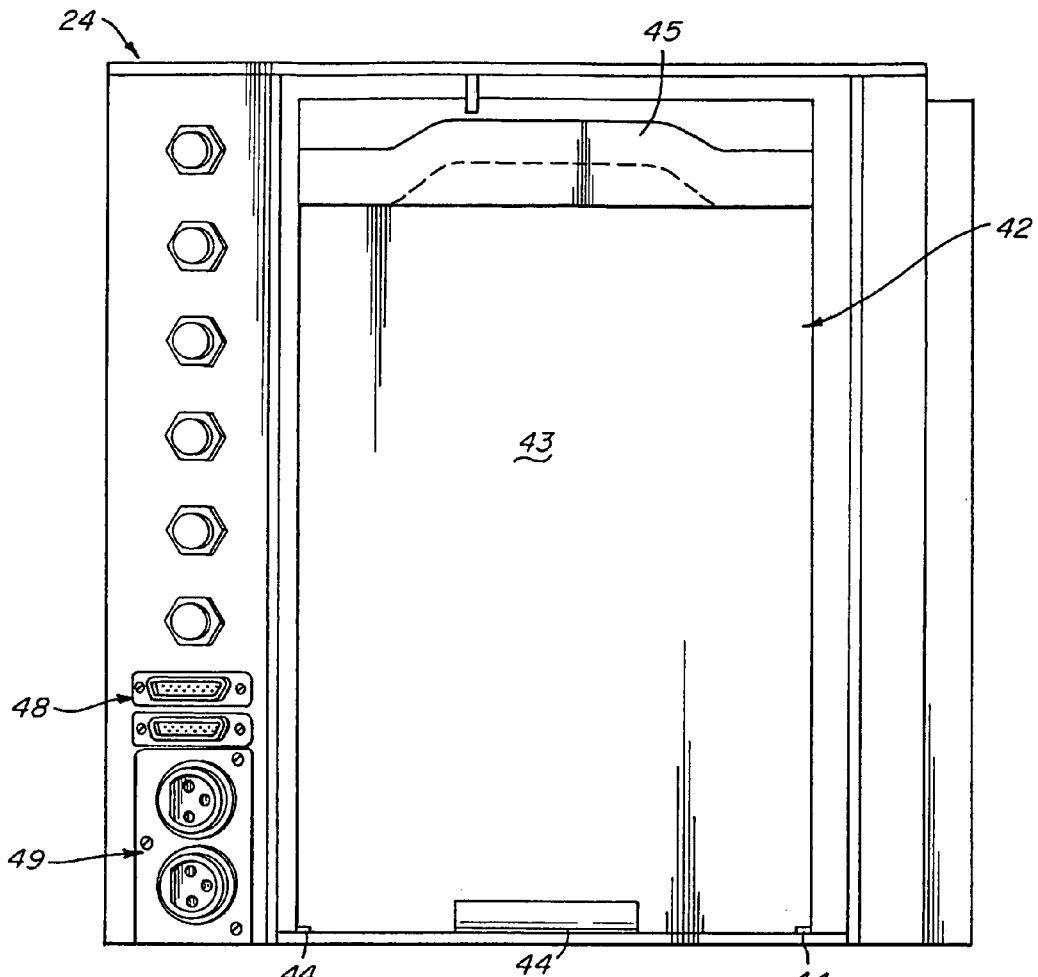
FIG. 3 is an enlarged view of the compartment opening for receiving the recording medium of the digital motion picture recorder of FIG. 2.
Figure 4:
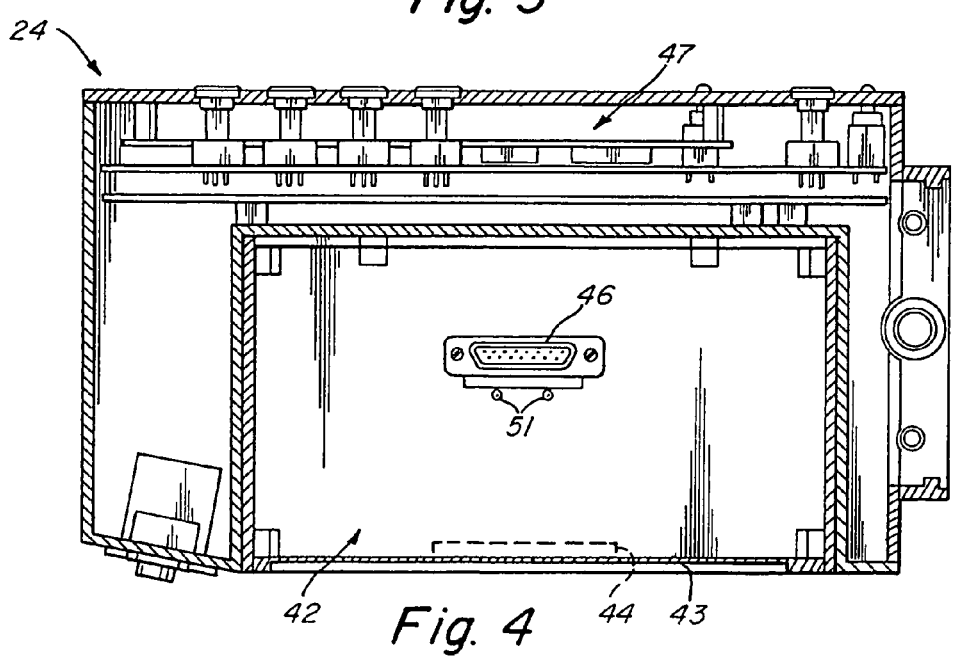
FIG. 4 is a top cross-sectional view of the digital motion picture recorder of FIG. 2 illustrating a compartment for receiving a recording medium.

FIG. 2 shows the opposite side view of the camera shown in FIG. 1. On this side of the camera is found the recording media compartment 42 which is accessed via a door 43. External connections, such as 48 and 49, can provide external video output, ETHERNET or other kinds of connections. A more detailed version of door 43 is shown in FIG. 3. It has a hinged section 44 and a handle 45 so that the door may be opened. Referring now to FIG. 4, a compartment 42 is an opening within the recorder and includes a connector 46 at the bottom of the compartment. The recording media, to be described below, connects to this connector 46 to provide electronic connection to the remainder of the circuitry of the recorder, located in area 47.

Figure 5A:
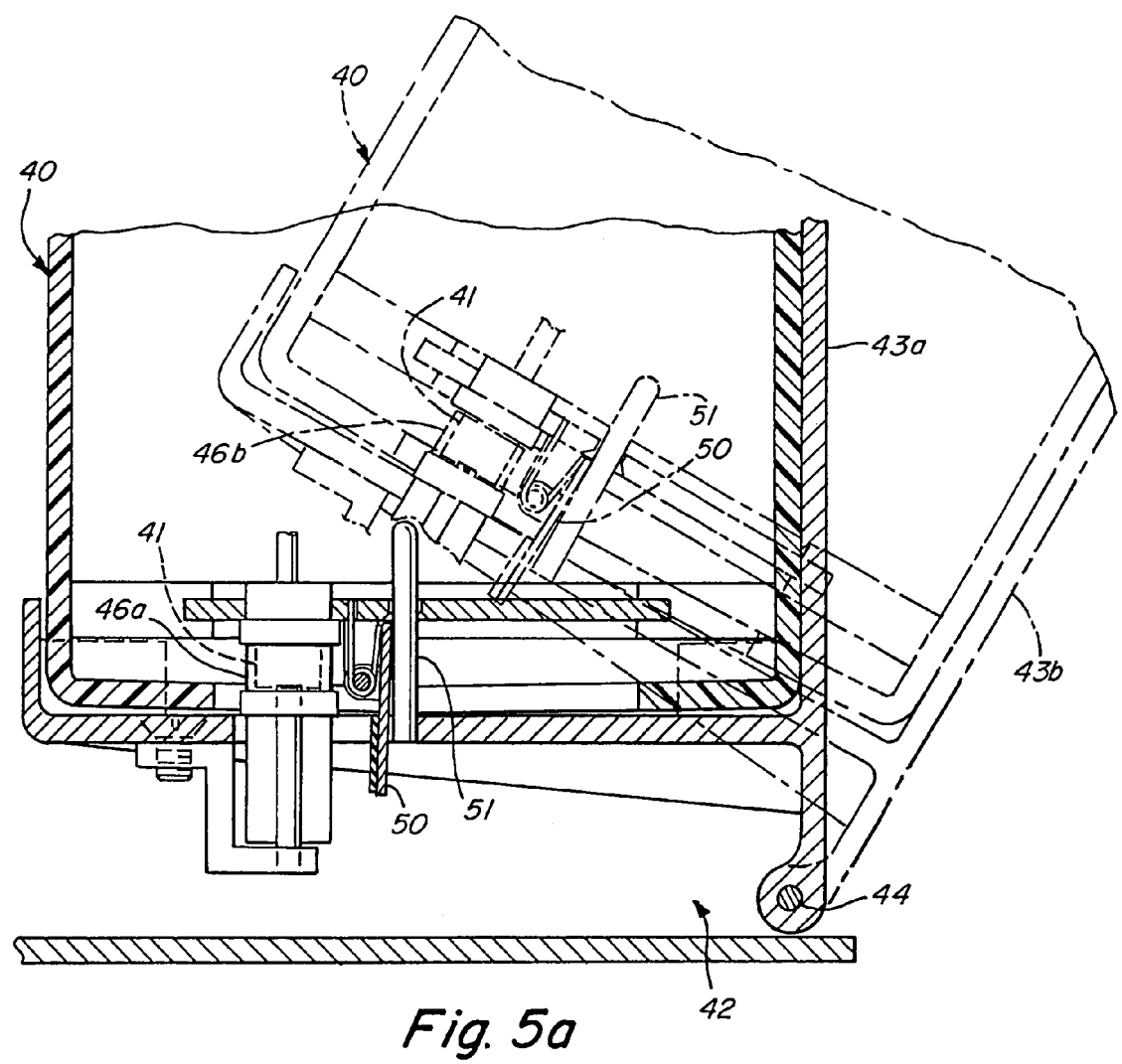
FIGS. 5a and 5b illustrate the details of conductivity of the recording medium to the digital motion picture recorder in the compartment shown in FIG. 4.
Figure 5B:
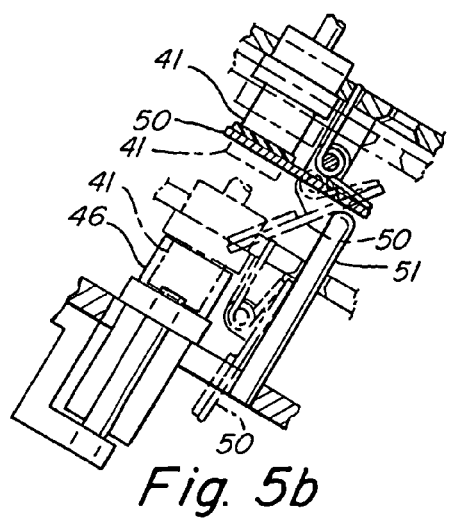

FIG. 5a shows details of the door 43 and how connection is made between the recording media and the connector 46. In FIG. 5a, the door 43a is closed and the recording media is fully engaged and connected with connector 46a. The door at 43b and connector 46b illustrate the open position at the onset or connection. FIG. 5b illustrates how a hinged protective flap 50 on the recording media rotates when a protrusion 51, near the connector 46, pushes it out of the way upon insertion of the recording media package.

Figure 6:
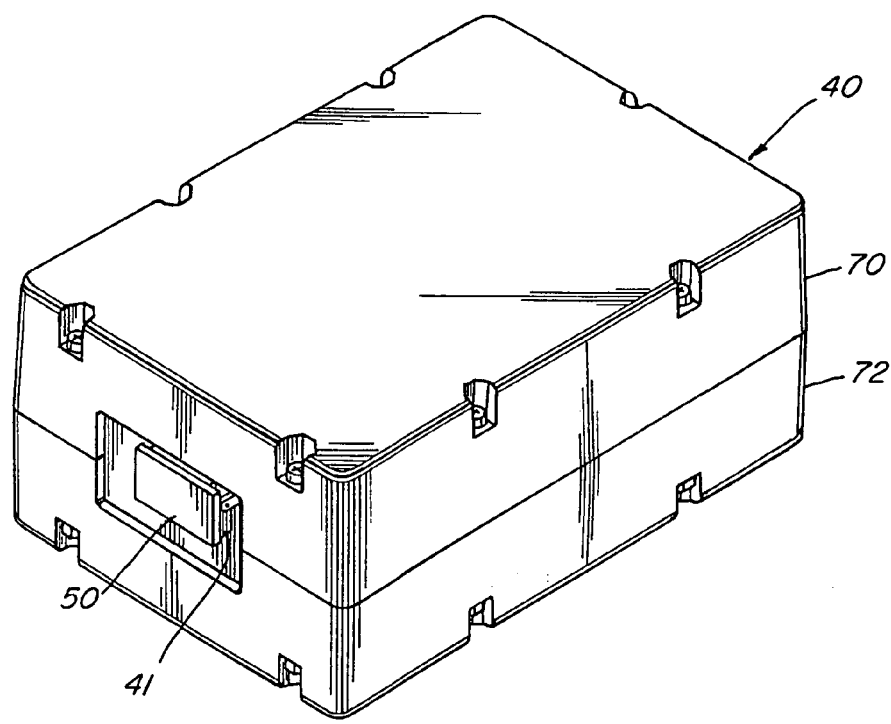
FIG. 6 is a perspective view of the cartridge containing the recording medium.

The recording media of this embodiment of the invention will now be described in connection with FIGS. 6-10. FIG. 6 is an illustration of a top portion 100 of the recording media cartridge which is placed directly into the compartment 42 of the recorder. This cartridge is ruggedized for field use and typically is made of a hard plastic material. Ruggedization allows a disk drive package to withstand the rough treatments of sometimes hostile field environment in which video recorders are used. The drive package includes the use of thermally conductive material which draws excessive heat away from the package, thereby further reducing potential disk failure. To achieve this, the disk drive package is placed in a packed shell assembly which includes shock and vibration protection mechanisms for the media as well as heat dissipation materials in a manner to be described in connection with FIGS. 7-10.

Figure 10:
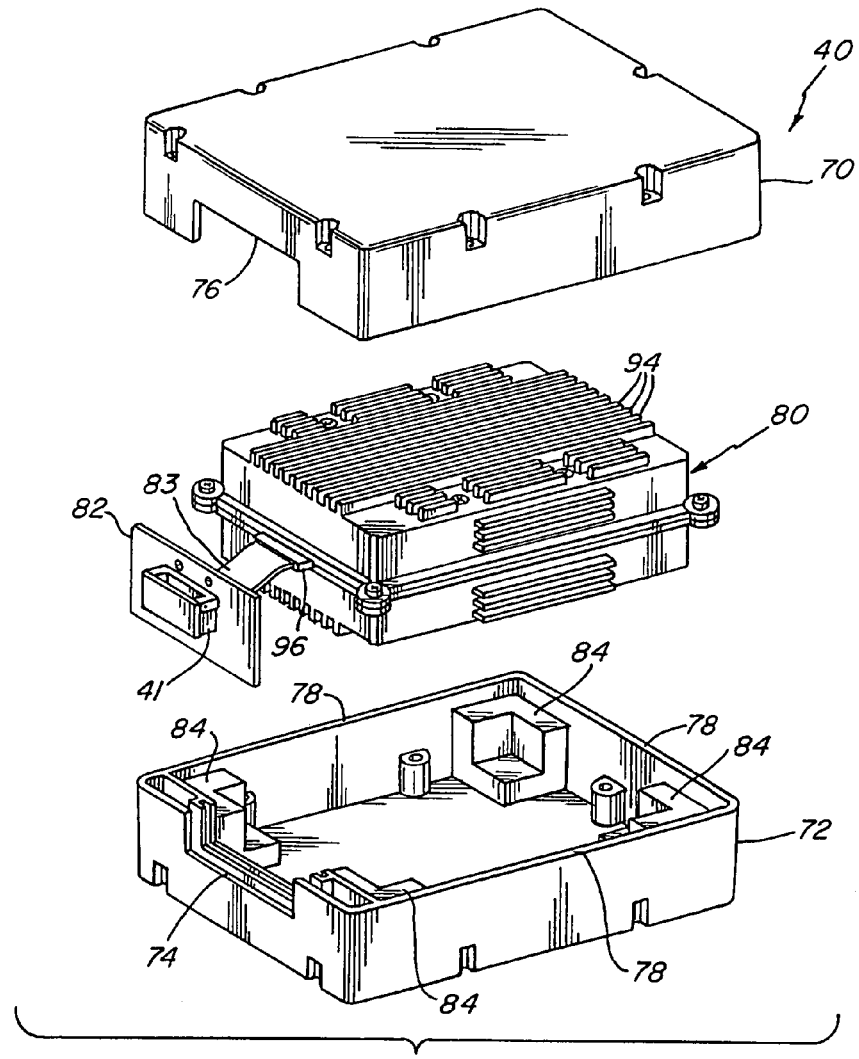
FIG. 10 is an exploded perspective view of the recording media cartridge of FIG. 6.

Referring now to FIG. 10, which is an exploded view of a cartridge made including the top portion 40 of FIG. 6, the cartridge has a first portion 70 and a bottom portion 72 which are adapted to meet each other along edges 78 to provide a substantially environmentally sound interconnection. A connector 82 is adapted to be placed in the notch formed by edges 76 and 74. This connector is connected to a media package 80 via a printed circuit board 94 and a ribbon cable 83. Printed circuit board 94 includes circuitry to divide an incoming data stream into two data streams to two separate media devices or to combine two outgoing data streams from the two separate media devices found in media package 80, which will be described below. This division and combination is a process called striping. Each of the corners of the cartridge portions 70 and 72 is shown having shock and vibration absorbing material 84 which may be a material bearing the product name called SORBA THANE, available from Sorbathane, of Kent, Ohio. Such a material is a polyurethane elastomer such as described in U.S. Pat. Nos. 4,346,205, 4,476,258, 4,777, 739, and 4,808,469. The material 84 is formed in a shape that holds each of the corners of the media package 80 to absorb shocks and vibration.

Figure 7:
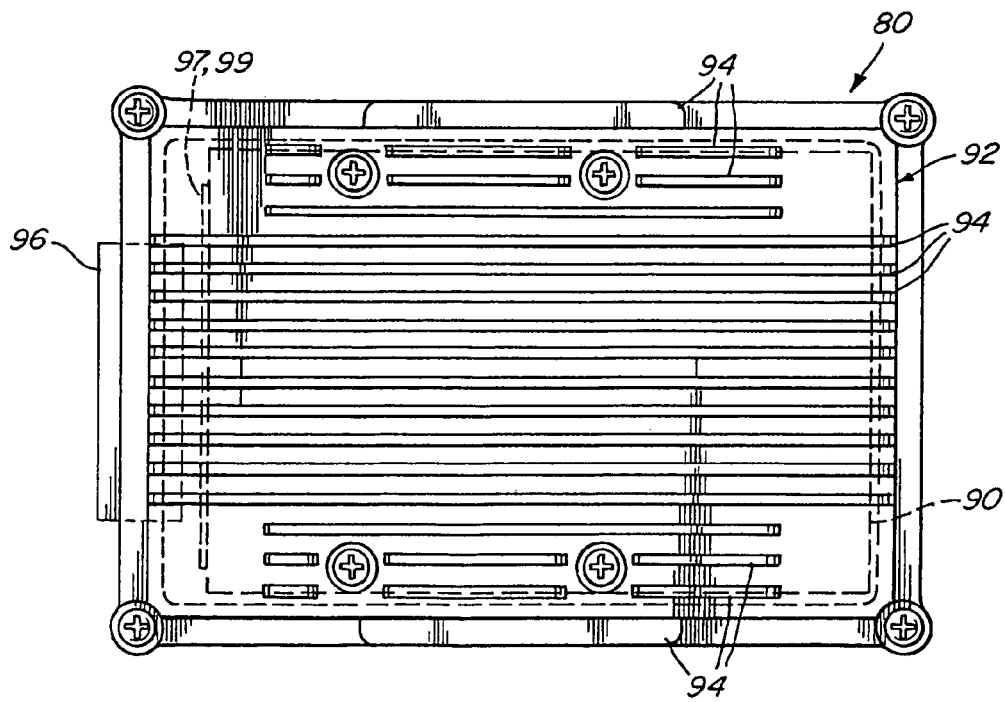
FIG. 7 is a top view of the recording media package found inside the cartridge of FIG. 6.
Figure 8:
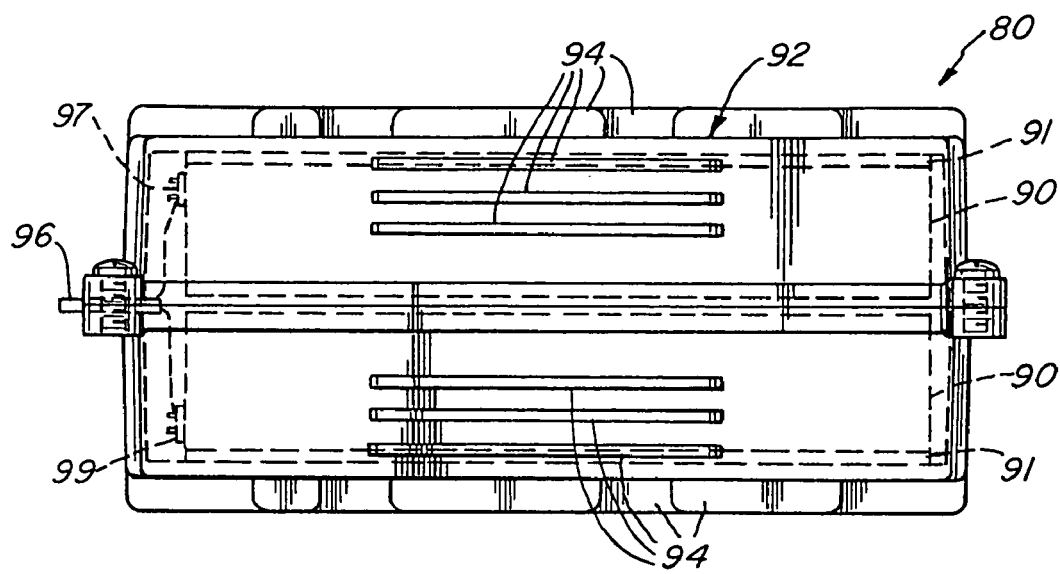
FIG. 8 is a side view of the package of FIG. 7.
Figure 9:
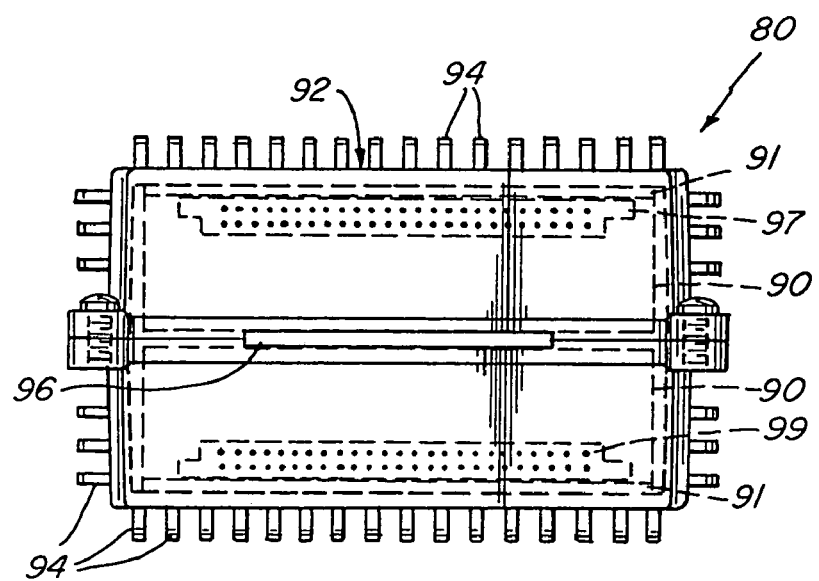
FIG. 9 is an end view of the package of FIG. 7.

FIGS. 7, 8 and 9 are top, side and end views, respectively, of the media package 80. Referring to FIGS. 7-9, two disk drives 90 are combined to form one media package 80. The disk drives 90 preferably have a thin thermally conductive pad to direct head away from the disk drives 90. In the media package, disk drives 90 are enclosed in a heat sink package 92. Heat sink fins 94 are provided on the top, bottom, side and end faces of the package. A connector 96 provides connection to the ribbon cable 83. This connector connects to connectors 97 and 99 on the disk drives 120.

The disk drives 90 (and associated signal processing circuitry) should be able to record video and audio data streams at sustained rates of typically four (4) megabytes per second (MBps). At present, the TravelStar LP disk drive, having capacity of 720 MB is available from IBM Corporation of Yorktown Heights, N.Y., and is the preferred recording medium. Disk drives of increased capacity will become readily available in the future, thus increasing the possible recording time of the device. Two such disk drives are combined to form the media package 80. Of course, instead of a magnetic disk drive, any number of other types of digital random-access storage media may be used, such as optical drives, magneto-optical drives, DRAMs, flash memories, etc.

The disk drive 40 is preferably self-contained and includes electrical contacts 41 and 43 and mating contacts 45 and 47 in chamber 42 which serve to provide power to the disk drive, facilitating read/write functions and performing other related functions.

Figure 11:
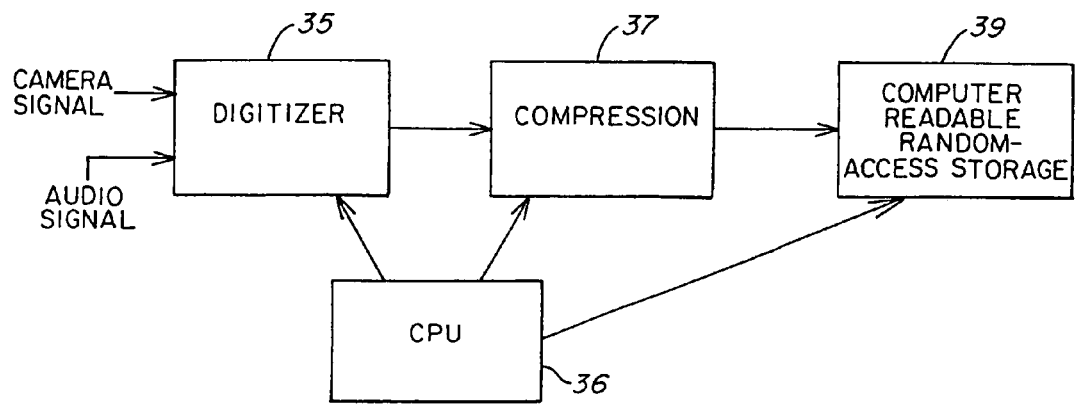
FIG. 11 is a block diagram of the electronic circuitry which processes the camera and audio signals into media files for storage on a computer readable and writable random access storage medium.
Figure 12:
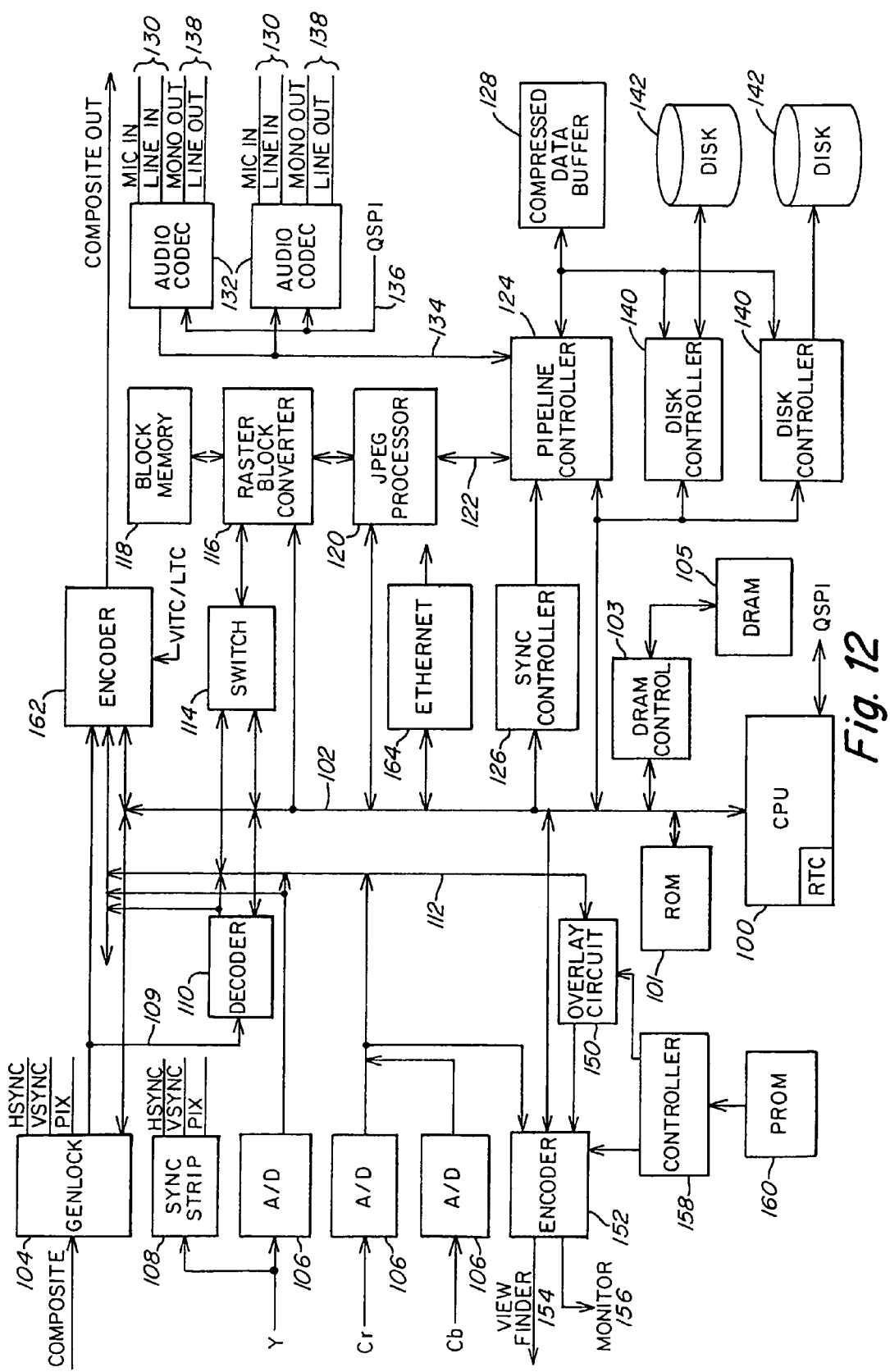
FIG. 12 is a more detailed block diagram of the block diagram of FIG. 11.

Having now described the mechanical structure of the preferred embodiment of the motion picture recorder of this invention, the electronic circuitry for processing the motion pictures will now be described. The output of the video camera 22, which is generally an analog signal, is provided to the digitizing electronic circuitry such as shown in FIGS. 11-12. The circuity includes a digitizer 35, compression circuitry 37, and a computer-readable and writable random-access recording medium 39, such as a disk drive, as described above. While the digitizer 35 may be required for those video cameras which produce an analog output signal, the digitizer would be unnecessary if the output of the video camera were to be digital. In some A prior art systems, the images captured by the camera 22 of FIG. 1 is impressed upon a charge coupled device (CCD), well known to those skilled in the art. The CCD produces an electrical signal, which is then processed (either digitally or with analog circuitry) to create either an analog video signal so that those signals may be passed to a conventional analog video cassette recorder. The present invention may include circuitry to generate a digital video signal or a digital video information stream. Such a digital video information stream may be input directly to the compression circuitry 37 of FIG. 11, eliminating the digital-to-analog and analog-to-digital conversions associated with prior art devices from the circuitry within the camera 22.

However, in interfacing the recorder of the present invention with presently existing analog output video cameras, the digitizer 35 is used. The digitizer may comprise a number of analog to digital (A/D) converters. These converters, well known to those skilled in the art, may accept the output of the analog video camera, and may comprise on A/D converter for each component Y, Cv and Cb signal from the video camera. Other color formats may be used. However, the Y, Cr, Cb format is preferable for use with the well known Joint Photographer's Expert Group (JPEG) compression standard, which may be used in this motion picture recorder. Other compression standards, well known in the art, such as MPEG, may also be suitable for use in the present invention. However, the use of JPEG compression simplifies editing because it does not rely on relationships of adjacent frames, but instead each frame is self-contained. The audio signal is also digitized from a microphone. Digitization is unnecessary if a digital microphone is used. The digitizing and compression/decompression circuitry is similar to that shown in U.S. Pat. Nos. 5,355,450, 5,045,940 and published Patent Cooperation Treaty (PCT) applications WO93/12481 and WO93/12613.

One difference between the systems described in the above patents and published applications and the present invention is that the present invention does not require a frame grabber or frame buffer. The frame buffer is eliminated to reduce power consumption, as will be seen to be desirable with a portable, battery power system. Its removal is possible by using a high throughput compression circuit such as the ZR36050 and ZR36015 JPEG compression circuits, available from Zoran of Santa Clara, Calif. These circuits provide full 60 field per second uncompressed data rates for 720×480 digital still images, which provides broadcast quality images. Due to the high throughput compression circuit, the compression circuitry does not require any stalling or metering mechanism for delaying processing of data through this pipeline. Other circuits are available, such as from LSI Logic.

In order to maintain correct color of the captured images from the video camera, the signals from the camera preferably should be calibrated to match well known and established SMPTE digital video color standards. In the absence of such calibration, the compression circuitry of the preferred embodiment, based on the well known and established JPEG compression standard, may create errors because JPEG compression relies on frequencies derived from the colors present in the signal. Calibration is done automatically in response to actuation of a calibration selection switch 33 on the video recorder of FIG. 1. Such calibration typically is performed both periodically during use and whenever a camera is associated with new calibration and digitizing circuitry.

Calibration is performed by causing the camera to generate a reference signal. A commonly-used reference signal is known as "color bars." These color bars for any given camera will come in a predetermined format and are typically generated by the camera circuitry in a known manner. Using this format, the overall signal level of the color bar signal is determined by the recorder, and thus the values output by the camera and, by inference, the CCD device are determined. These values are then mapped using well known mapping techniques to the SMPTE standard for digital color representations stored in the recorder of the present invention. More precisely, the A/D converters in the digitization process, described below, are adjusted so, that the analog level output in the reference signal are translated to the corresponding SMPTE digital value. By creating this mapping in a deterministic way, the camera is thus forced into providing a SMPTE compliant digital video information. It is therefore no longer necessary to record color bars as is common with video tape. It may, nonetheless, be preferable to store a single frame of color bars digitally in connection with each recorded clip of compressed video.

These components shown in FIG. 11 as well as overall camera and recorder control operate under the control of a central processing unit (CPU) 36, such as the MC68341, available from Motorola, Inc., which runs under control of a real-time operating system such as the VXWorks operating system available from Wind River Systems of Alameda, Calif.

Management of media files and the disk controller may be performed by any number of known techniques, including that disclosed in U.S. Pat. No. 5,267,351, assigned to the assignee of the present invention and as disclosed in published PCT application WO 93/21636. Data files are in the DOS file format, supplemented by a media file format known as the Open Media Framework (OMF), defined in the OMF Interchange Specifications available from Avid Technology and available in the OMF Interchange Toolkit, also available from Avid Technology.

A more detailed block diagram of the circuitry shown in FIG. 11 will now be described in connection with FIG. 12. As described above, the digitizing circuitry is controlled by a central processing unit 100, such as the Motorola MC68341 processor, running a real-time operating control system as described above. The central processing unit 100 has a main address and data bus 102 to which other parts of the system are connected.

Digitizing circuitry includes a GENLOCK circuit 104, which processes composite video signals, and a set of analog-to-digital converters 106, associated with a synchronization signal stripping circuit 108, which processes component video signals into a YUV 4:2:2 format digital signal. The composite video signal output by the GENLOCK circuit 104 is provided to a decoder 110, which converts it into a digital component information, similar to that output by the analog-to-digital converters 106. The horizontal synchronization signal (HSYNC), vertical synchronization signal (VSYNC), and the pixel clock (PIX) are used to synchronize the rest of the circuit. The composite signal is provided along a bus 109 to a decoder 110 which translates it into a YUV 4:2:2 digital component signal. The composite signal is also directed to encoder 152.

The component digital signals are applied to a pixel bus 112 which directs them through a switch 114, such as a multiplexer, to a raster block converter 116 and memory 118, which generates picture blocks from the serial pixel data for use and processing according to the JPEG compression standard described above. The transfer of pixel data to the raster block converter 116 bypasses the central processing unit (CPU) 100, i.e., pixel data is not written to the CPU's main memory 105. A JPEG processor 120 interacts with the raster block converter 116 and memory 118 to take a digital still image obtained from the pixel data and compresses it using the JPEG compression standard to provide an output as indicated at 122. The JPEG compression standard can be modified to provide improved image quality while maintaining good compression levels in accordance with the teachings of U.S. Pat. No. 5,355,450.

As to audio signals inputted, a microphone or line-in signal indicated at 130 is applied to one or more audio coder and decoders (CODEC) 132 which provide a serial digital output 134. Additionally, they may receive digital input via the QSPI bus 136 to convert them to analog output signals at 138. The serial audio data 134 and the compressed video data 122 are applied to a pipeline control circuit 124. The pipeline control circuit 124 is controlled using synchronization control information from a synchronization controller 126 to direct the data into a compressed data buffer 128 typically implemented as a dynamic RAM. A suitable size for this buffer is 2M×32 and it is typically implemented logically as a ring buffer. The pipeline control circuit may be implemented in accordance with the teachings of U.S. Pat. No. 5,045,940 and PCT publication WO 93/12481. The CPU 100 controls synchronization controller 126, pipeline control circuit 124 and disk controllers 140 to direct the flow of the video and audio data between memory 128 and the disk storage 142. Two disk controllers are used for performing conventional striping. However, one controller may be used to send commands to circuitry on the drive package, as shown at 116 in FIG. 10, which divides an incoming stream or combines an outgoing stream of data in response to commands from a single disk controller 100. Striping may be performed at the word level, or at block or byte levels. The disk controllers and associated bus to the disk are preferably either IDE or SCSI controllers.

This system may also be provided with the capability of providing an output video signal generated from the digitized video signal. For example, the pixel bus 112 may be connected to an overlay circuit 150. The output of the overlay circuit 150 and the composite signal 109 may be provided to an encoder 152. The output of the encoder may be provided back to the camera which has an input for the view finder 154. Additionally, this signal may be provided to monitor 156. In a preferred embodiment, the camera's view finder 154 can receive a signal not only from the camera, but also from an alternate source. Using this capability, the motion picture recorder of this invention may provide a controller 158 and an associated memory 160 which may provide additional status information via the view finder in connection with the video being recorded. Such status information may be an indication of battery level, time codes, time of day, function performed (e.g., recording or playback), etc.

The central processing unit 100 also has associated with it a programmable read-only memory, preferably a flash memory 101 in which program information is stored and a dynamic RAM controller 103 and dynamic RAM 105, which are common in the art, for storing volatile data while processing. Typically the memory 101 will contain an operating system and other programming code which must be kept in non-volatile storage. A suitable size for this memory 101 is 4M. A suitable DRAM size is 4M×16.

The motion picture recorder of this invention may also be provided with additional encoder 162 which can provide a composite-out video signal with VITC/LTC control information. The input to the encoder may be anyone of the pixel bus 112, the output of decoder 110, bypassing pixel bus 112, the output of A/O converters 106, bypassing pixel bus 112 or the output 109 of genlock circuit 104. Additionally, an ETHERNET connection 164 may also be provided.

In preferred embodiments of this invention, the GENLOCK circuit 104 may be a Raytheon 22071 GENLOCK circuit. The decoder 110 may be a Raytheon SAA7151 decoder. The encoders 152 and 162 may also be either a Raytheon or TRW 22191 full video encoder. The ETHERNET circuit, audio modules and disk controller are available in a variety of forms and are available from a number of suppliers.

Because the recording media in this system allows for direct computer access, being already in a different format, the media package containing the hard drives, described above, can be simply removed from the recorder 24 and connected directly to a computer system which may be used to edit or broadcast the recorded video, such as the Avid Media Composer, Avid News Cutter, and Avid AirPlay Systems, all of which are available from Avid Technology, Inc. of Tewksbury, Mass. The disk drive package is of an external physical shape and electrical connection configuration to facilitate its insertion into a suitable "docking station" on the above computer systems. This facility greatly reduces the time from videography to broadcast over prior art techniques described above.

The display 30 shown in FIG. 1 provides further advantages of the present invention over the prior art. In prior art systems, the linear recorder performs the function of recording and perhaps playback of the material recorded on the single videocassette in the system. Editing of the material must await the videocassette being mounted in an analog video editor, or, more recently, a non-linear video editor once the video material has been digitized. The present invention provides a digitized, compressed-form material which may be readily edited. The recorder of FIG. 1 preferably contains an editing system, such as the editing system described in U.S. Pat. No. 5,267,351 and PCT published application WO93/21636, the disclosure of which is incorporated by reference herein. The inclusion of the editing system allows the user of the present invention to edit the video material recorded at the recording site, even prior to, or in lieu of, editing in a studio. This is particularly advantageous if the material must be broadcast immediately. Therefore, the video and audio signals may be recorded, edited and broadcast from the field in a very short period of time. During editing, information is played back through the digital video pipeline through either the view finder or other display. During editing it is possible to display video through an external video port, or to have the external video port transmit live video. The arrangement of a variety of video inputs and outputs provides switching capabilities in the camera similar to those found in a television broadcast studio.

The recorder 62 also preferably includes a number of pressure-sensitive or other suitable controls 64 well known to those skilled in the art and used, for example, in automatic teller machines and consumer-oriented camcorders, to provide recording and edit functions for the material displayed on display 30. The display 30 may be of a LCD or other suitable thin panel type.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art.

For example, all digital-to-analog conversion circuitry may be eliminated from the camera because processing of analog signals is no longer necessary.

Additionally, although the media package is described herein as removable, it need not be removable. Additionally, disk drives may be external to the camera, for example, in a rack mount. Rather than record to disk, an output may be directed to a computer network, such as an ATM network, or a transmitter, such as a cellular, satellite, or microwave or phone link. By providing removable disk drives, a disk drive becomes filled with recorded video material, a new, empty disk drive can be inserted to replace the filled drive, similar to replacement of a video tape. It is also possible to have two hard disk drive packs, and thus two receptacles in the video recorder 24 of the type shown in FIGS. 3 and 4. With such a system, continuous recording from one disk drive to the next can enable an indefinite amount of time to be recorded without loss of information due to switching of recording media.

These and other modifications are contemplated as falling within the scope of the invention as defined by the appended claims.

What is claimed is:

1. A digital motion picture recorder, comprising:
   a housing sized to be portable for use by an individual;
   a motion picture camera mounted in the housing, and providing a motion video signal as an output;
   recording circuitry, mounted in the housing, that converts the motion video signal into a sequence of digital still images;
   a digital, computer-readable and writable random-access medium mounted in the housing and connected to receive and store sequences of digital still images from the recording circuitry in data files in a computer-readable file format;
   a motion picture editing system within the housing configured to enable the individual to specify a sequence of segments of the sequence of digital still images stored on the digital, computer-readable and writable random-access medium, wherein the motion picture editing system enables the individual:
   a. to select a plurality of data files from among the data files,
   b. to define a segment from each of the selected data files, wherein each segment is defined by a reference to the selected data file storing a selected sequence of digital still images and by points designated in the selected sequence of digital still images, wherein the points may be designated at any digital still image, and
   c. to order the defined segments into the sequence of segments; and
   playback circuitry, mounted in the housing, that plays at least a portion of the specified sequence of segments by reading the sequences of digital still images stored on the digital, computer-readable and writable random-access medium, according to the specified sequence of segments, to generate a motion video signal therefrom.

2. An apparatus for digitally recording motion pictures, comprising:
   a housing sized to be portable for use by an individual;
   a motion picture camera mounted in the housing;
   recording circuitry, mounted in the housing, that provides a sequence of digital still images from the motion picture camera;
   a digital computer-readable and writable random-access medium mounted in the housing and connected to receive and store the sequence of digital still images in a computer-readable file format; and
   a processor mounted in the housing and executing computer program instructions comprising instructions stored in a memory and which instruct the processor to, in response to user input:
   receive and store sequences of digital still images from the motion picture camera into the digital computer-readable and writable random-access medium in data files in the computer-readable file format,
   enable the individual to define a sequence of segments of at least the sequences of digital still images stored on the digital computer-readable and writable random-access medium, wherein the processor enables the individual:
   a. to select a plurality of data files from among the data files,
   b. to define a segment from each of the selected data files, wherein each segment is defined by a reference to the selected data file storing a selected sequence of digital still images and by points designated in the selected sequence of digital still images, wherein the points may be designated at any digital still image, and
   c. to order the defined segments into the sequence of segments, and play at least a portion of the defined sequence of segments by reading the sequences of digital still images from the digital computer-readable and writable random-access medium according to the defined sequence of segments.

3. An apparatus for digitally recording motion pictures, comprising:
   a housing sized to be portable for use by an individual;
   a motion picture camera mounted in the housing;
   recording circuitry, mounted in the housing, that provides a sequence of digital still images from the motion picture camera;
   a digital computer-readable and writable random-access medium mounted in the housing and connected to receive and store sequences of digital still images from the motion picture camera in data files in a computer-readable file format; and an editing system, mounted in the housing, for enabling the individual to define a sequence of segments of at least the sequences of digital still images stored on the digital computer-readable and writable random-access medium, wherein the editing system enables the individual a. to select a plurality of data files from among the data files, b. to define a segment from each of the selected data files, wherein each segment is defined by a reference to the selected data file storing a selected sequence of digital still images and by points designated in the selected sequence of digital still images, wherein the points may be designated at any digital still image, and c. to order the defined segments into the sequence of segments, and for playing at least a portion of the defined sequence of segments by reading the sequences of digital still images from the digital computer-readable and writable random-access medium according to the defined sequence of segments.

4. A digital motion picture recorder, comprising:

a housing sized to be portable for use by an individual;

a motion picture camera mounted in the housing, and providing a motion video signal as an output;

recording circuitry, mounted in the housing, that converts the motion video signal into sequences of digital still images;

a digital, computer-readable and writable random-access medium mounted in the housing and connected to receive and store sequences of digital still images in data files in a computer-readable file format;

a motion picture editing system within the housing configured to enable the individual to specify a sequence of segments of the sequences of digital still images stored on the digital, computer-readable and writable random-access medium, wherein the motion picture editing system enables the individual:

a. to select a plurality of data files from among the data files, b. to define a segment from each of the selected data files, wherein each segment is defined by a reference to the selected data file storing a selected sequence of digital still images and by points designated in the selected sequence of digital still images, wherein the points may be designated at any digital still image, and c. to order the defined segments into the sequence of segments; and playback circuitry, mounted in the housing, that plays at least a portion of the specified sequence of segments by reading the sequences of digital still images stored on the digital, computer-readable and writable random-access medium, according to the specified sequence of segments, to generate a motion video signal therefrom.

5. A digital motion picture recorder, comprising:

a housing sized to be portable for use by an individual;

a motion picture camera mounted in the housing, and providing a motion video signal as an output;

recording circuitry, mounted in the housing, that converts the motion video signal into at least one sequence of digital still images;

a digital, computer-readable and writable random-access medium mounted in the housing and connected to receive and store the at least one sequence of digital still images in a data file in a computer-readable file format;

a motion picture editing system within the housing configured to enable the individual to specify a sequence of segments of the at least one sequence of digital still images stored on the digital, computer-readable and writable random-access medium, wherein the motion picture editing system enables the individual:

a. to select at least one data file from among data files stored on the digital, computer-readable and writable random-access medium, b. to define a plurality of segments from the at least one selected data file, wherein each segment is defined by a reference to a selected data file storing a selected sequence of digital still images and by points designated in the selected sequence of digital still images, wherein the points may be designated at any digital still image, and c. to order the defined segments into the sequence of segments; and playback circuitry, mounted in the housing, that plays at least a portion of the specified sequence of segments by reading the sequences of digital still images stored on the digital, computer-readable and writable random-access medium, according to the specified sequence of segments, to generate a motion video signal therefrom.

6. The apparatus of claim 2, wherein the computer-readable and writable random-access medium comprises a disk-type drive mounted in a container detachable from the housing.

7. The apparatus of claim 2, wherein the computer instructions further comprise instructions which instruct the processor to calibrate color in the sequence of digital still images to a standard.

8. The apparatus of claim 2, further comprising:

an overlay circuit for receiving an indication of data including at least one of a battery level, time codes, time of day and function performed, and generating video data indicative of the data; and an encoder for receiving the sequence of digital still images and the video data to generate a video signal combining the video data with the sequence of digital still images.

9. The apparatus of claim 2, wherein the reading and outputting of at least a portion of the sequence of digital still images from the digital computer-readable and writable random-access medium according to the defined sequence of segments further comprises directing the portion of the sequence of digital still images to a full video encoder.

10. The apparatus of claim 3, wherein the computer-readable and writable random-access medium comprises a disk-type drive mounted in a container detachable from the housing.

11. The apparatus of claim 3, further comprising means for calibrating color in the sequence of digital still images to a standard.

12. The apparatus of claim 3, further comprising:

an overlay circuit for receiving an indication of data including at least one of a battery level, time codes, time of day and function performed, and generating video data indicative of the data; and an encoder for receiving the sequence of digital still images and the video data to generate a video signal combining the video data with the sequence of digital still images.

13. The apparatus of claim 3, wherein the reading and outputting of at least a portion of the sequence of digital still images from the digital computer-readable and writable random-access medium according to the defined sequence of segments further comprises directing the portion of the sequence of digital still images to a full video encoder.

14. The digital motion picture recorder of claim 1, wherein the computer-readable and writable random-access medium comprises a disk-type drive mounted in a container detachable from the housing.

15. The digital motion picture recorder of claim 1, further comprising means for calibrating the motion picture signal to a digital video color standard.

16. The digital motion picture recorder as in any of claims 1, 4 or 5, wherein:
- the recording circuitry further comprises compression means; and
- the computer-readable file format is a compressed file format.

17. The apparatus as in claims 2 or 3, wherein:
- the means for providing recording circuitry further comprises compression means; and
- the computer-readable file format is a compressed file format.

18. A digital motion picture recorder, comprising:
a housing sized to be portable for use by an individual;
a motion picture camera mounted in the housing and providing a sequence of digital still images as an output;
a digital, computer-readable and writable random-access medium mounted in the housing and connected to receive and store sequences of digital still images in data files in a computer-readable file format;
a motion picture editing system within the housing configured to enable the individual to specify a sequence of segments of the sequence of digital still images stored on the digital, computer-readable and writable random-access medium, wherein the motion picture editing system enables the individual:
  a. to select a plurality of data files from among the data files,
  b. to define a segment from each of the selected data files, wherein each segment is defined by a reference to the selected data file storing a selected sequence of digital still images and by points designated in the selected sequence of digital still images, wherein the points may be designated at any digital still image, and
  c. to order the defined segments into the sequence of segments; and
playback circuitry, within the housing, having an input for reading, according to the specified sequence of segments, at least a portion of the sequences of digital still images stored on the digital, computer-readable and writable random-access medium and an output providing a motion video signal therefrom.

19. An apparatus for digitally recording motion pictures, comprising:
a housing sized to be portable for use by an individual;
a motion picture camera mounted in the housing and providing a sequence of digital still images;
a digital computer-readable and writable random-access medium mounted in the housing and connected to receive and store sequences of digital still images in a computer-readable file format; and
a processor mounted in the housing and executing computer program instructions comprising instructions stored in a memory and which instruct the processor to, in response to user input:
receive and store sequences of digital still images from the motion picture camera into the digital computer-readable and writable random-access medium in data files in the computer-readable file format,
enable the individual to define a sequence of segments of at least the sequences of digital still images stored on the digital computer-readable and writable random-access medium, wherein the processor enables the individual:
  a. to select a plurality of data files from among the data files,
  b. to define a segment from each of the selected data files, wherein each segment is defined by a reference to the selected data file storing a selected sequence of digital still images and by points designated in the selected sequence of digital still images, wherein the points may be designated at any digital still image, and
  c. to order the defined segments into the sequence of segments; and
read and output at least a portion of the sequence of digital still images from the digital computer-readable and writable random-access medium according to the defined sequence of segments.

20. An apparatus for digitally recording motion pictures, comprising:
a housing sized to be portable for use by an individual;
a motion picture camera mounted in the housing and providing a sequence of digital still images;
a digital computer-readable and writable random-access medium mounted in the housing and connected to receive and store sequences of digital still images from the motion picture camera in data files in a computer-readable file format; and
an editing system, mounted in the housing, for enabling the individual to define a plurality of segments of at least the sequences of digital still images stored on the digital computer-readable and writable random-access medium, wherein the processor enables the individual: a. to select a plurality of data files from among the data files, b. to define a segment from each of the selected data files, wherein each segment is defined by a reference to a data file storing a selected sequence of digital still images and by points designated in the selected sequence of digital still images, wherein the points may be designated at any digital still image, and c. to specify and edit a sequence of the defined plurality of segments including defining an order of the defined plurality of segments in the sequence, and for reading and outputting at least a portion of the sequence of digital still images from the digital computer-readable and writable random-access medium according to the defined sequence of segments.

* * * * *